United States Patent Office 3,040,017
Patented June 19, 1962

3,040,017
OCTAPEPTIDES
Robert Schwyzer, Riehen, and Bernhard Riniker, Birsfelden, Switzerland, assignors to Ciba Corporation, a corporation of Delaware
No Drawing. Filed June 22, 1959, Ser. No. 821,718
Claims priority, application Switzerland July 8, 1958
4 Claims. (Cl. 260—112)

The present invention relates to the manufacture of new polypeptides having the action of Hypertensin.

There is known the decapeptide Hypertensin I, which occurs in equine serum and has the amino acid sequence L-aspartic acid, L-arginine, L-valine, L-tyrosine, L-isoleucine, L-histidine, L-proline, L-phenylalanine, L-histidine, L-leucine, and is designated as Ileu$^5$-Hypertensin$^I$, as well as Val$^5$-Hypertensin I, likewise a decapeptide, which occurs in bovine serum and differs from the aforementioned product only by the fifth amino acid, L-valine. Another octapeptide, namely Ileu$^5$-Hypertensin II, has been isolated from equine serum; from the corresponding Hypertensin I it is distinguished by the absence of the 9th and 10th amino acids, and it is formed from the decapeptide by an enzyme contained in the serum. It would obviously be a great advantage to the synthesis of compounds having the action of Hypertensin if certain amino acids could be replaced with other, simpler amino acids that are more advantageous to prepare industrially.

The present invention provides octapeptides of the formula glycyl-L-α-(lower amino-alkyl)-α-amino-acetyl-L-α-lower alkyl-α-amino-acetyl-L-tyrosyl-L-α-lower alkyl-α-amino acetyl-L-histidyl-L-prolyl-L-phenylalanine.

They display a surprisingly good Hypertensin action, more especially the glycyl-L-arginyl-L-valyl-L-tyrosyl-L-valyl-L-histidyl-L-prolyl-L-phenylalanine of the formula

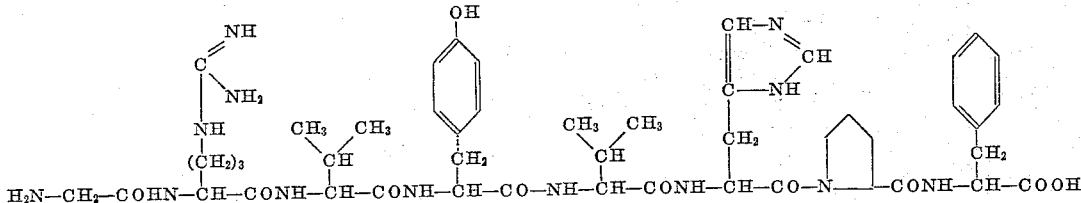

The afore-mentioned octapeptides offer considerable industrial advantages over the known Hypertensins in that they are much easier and cheaper to manufacture.

The residue of an L-α-(lower amino-alkyl)-α-aminoacetic acid is more especially L-arginyl, L-ornithyl or L-lysyl, while the residue of an L-α-lower alkyl-α-aminoacetic acid may be valyl or norvalyl, or leucyl, isoleucyl or norleucyl, or alanyl, that is to say preferably a residue of a natural amino acid.

The new peptides are obtained by methods known for the manufacture of peptides, the individual amino acids being linked together sucessively or else smaller peptide units are first formed and then linked together. Thus one of the amino acid or peptide molecules in the form of an ester may be linked with a further amino acid or peptide molecule containing a protected amino group, in the presence of a condensing agent such as a carbodiimide or a phosphorous acid ester halide; or else the amino acid ester or peptide ester containing a free amino group can be reacted with an amino acid or a peptide containing an activated carboxyl group (and a protected amino group), for example an acid halide, azide, anhydride or an activated ester, such as cyanomethyl ester or carboxymethyl thiol ester. Conversely, an amino acid or a peptide containing a free carboxyl group (and a protected amino group) can be reacted with an amino acid or a peptide containing an activated amino group (and a protected carboxyl group), for example with a phosphite amide. The formation of any of the peptide bonds according to the invention can be achieved by any of the afore-mentioned methods, though the processes described in the examples offer special advantages. Any free functional groups not participating in the reaction are advantageously protected, more especially by radicals that are easy to split off by hydrolysis or reduction, the amino group for instance through the tosyl or trityl radical and more especially the carbobenzoxy group or a colored protective group such as the paraphenylazobenzyloxy-carbonyl group and the para-(para'-methoxyphenylazo)-benzyloxy-carbonyl group. The hydroxyl group of the tyrosyl need not necessarily be protected during the reaction.

A protected amino group is converted into a free amino group and a functionally converted carboxyl group into a free carboxyl group in the course of the process of preparing the octapeptides and intermediates, by as such known methods by treatment with a hydrolysing or reducing agent respectively.

Depending on the reaction conditions the new compounds are obtained in the form of the bases or of salts thereof. From the salts the bases can be prepared in known manner. Reaction of the bases with therapeutically acceptable acids yields salts, for example those with inorganic acids such as the hydrohalic acids (for example hydrochloric or hydrobromic acid), nitric, thiocyanic, sulfuric or phosphoric acid, or with organic acids such as acetic, propionic, glycolic, lactic, pyruvic, oxalic, malonic, succinic, maleic, fumaric, tartaric, citric, benzoic, cinnamic, salicylic, 2-phenoxybenzoic, 2-acetoxybenzoic, mandelic, methanesulfonic, ethanesulfonic, hydroxyethanesulfonic, benzenesulfonic or toluenesulfonic acid.

The octapeptides obtained by the present process can be used as hypertensive drugs in the form of pharmaceutical preparations. These preparations contain the peptide in admixture with a pharmaceutical organic or inorganic excipient suitable for enteral or parenteral administration. Suitable excipients are substances that do not react with the polypeptides, for example gelatine, lactose, glucose, sodium chloride, starches, magnesium stearate, talc, vegetable oils, benzyl alcohols, gums, polyalkylene, glycols, white petroleum jelly, cholesterol or other known medicinal excipients. The pharmaceutical preparations may be, for example, tablets, dragees, powders, ointments, creams or suppositories, or in liquid form solutions, suspensions or emulsions. If desired, they are sterilized and/or contain auxiliaries such as preserving, stabilizing, wetting or emulsifying agents. They may further contain other therapeutically useful substances.

The following examples illustrate the invention.

EXAMPLE 1

N-Carbobenzyloxy-Glycyl-Nitro-L-Arginine 1.35 grams (0.005 mol) of finely powdered nitro-L-arginine methyl ester hydrochloride are suspended in 7 cc. of dimethyl formamide, 1.21 cc. (0.0051 mol) of tributylamine are added, and the mixture is stirred until all has passed into solution. 1.85 mg. (0.009 mol) of dicyclohexyl carbodiimide and 1.46 grams (0.007 mol) of N-carbobenzyloxy-glycine in solid form are then tipped in, and the whole is kept overnight at room temperature. 0.5 cc. of glacial acetic acid is added and the mixture is kept for 1 hour, the crystalline dicyclohexyl urea (1.6 grams) formed is filtered off, and the filtrate is evaporated almost to dryness in a high vacuum and taken up in ethyl acetate. It is then washed successively with 2 N-hydrochloric acid, 2 N-sodium carbonate (ice-cold) and water, dried over sodium sulfate and evaporated, to yield 2.8 grams of crude N-carbobenzyloxy-glycyl-nitro-L-arginyl methyl ester which is hydrolyzed as it is.

2.8 grams of this methyl ester are dissolved in 10 cc. of methanol and 10 cc. of aqueous N-sodium hydroxide solution are added dropwise at 20° C. in the course of 1 hour. On completion of the dropwise addition the mixture is stirred on for ½ hour, a small amount of undissolved material (i.e. dicyclohexyl urea) is filtered off and the filtrate acidified with 10.5 cc. of N-hydrochloric acid. The precipitating oily substance is extracted with n-butanol, and the butanolic phase is washed with water and evaporated to dryness. When it is triturated with ethyl acetate, crystallization sets in, to yield 1.3 grams of N-carbobenzyloxy-glycyl-nitro-L-arginine melting at 135–138° C. After having been crystallized once from hot methanol, 1.22 grams of substance melting at 142–144° C. are obtained.

EXAMPLE 2

*N-Carbobenzyloxy-Glycyl-Nitro-L-Arginyl-L-Valyl-L-Tyrosyl - L - Valyl - L - Histidyl - L - Prolyl - L - Phenylalanine Methyl Ester*

775 mg. (0.001 mol) of L-valyl-L-tyrosyl-L-valyl-L-histidyl-L-prolyl-L-phenylalanine methyl ester, prepared as described in U.S. patent application S.N. 680,904 filed August 27, 1957, now U.S. Patent No. 2,978,444, issued April 4, 1961, and 474 mg. (0.0023 mol) of dicyclohexyl carbodiimide are dissolved in 2 cc. of dimethyl formamide and 10 cc. of acetonitrile, and a solution of 820 mg. (0.002 mol) of N-carbobenzyloxy-glycyl-nitro-L-arginine in 2 cc. of dimethyl formamide is added. The mixture is kept overnight at 20° C. 0.2 cc. of glacial acetic acid is added, the whole is again kept for some time, and the crystalline dicyclohexyl urea (450 mg.) formed is filtered off. The filtrate is evaporated as far as possible in a high vacuum at 40° C., taken up in n-butanol, and the organic layer is washed with ice-cold sodium carbonate solution and then with water and without intermediate drying concentrated in vacuo at a bath temperature of 50° C. to about its half volume, whereby a finely granular precipitate is obtained which is filtered off, washed with ethyl acetate and dried at 50° C., to yield 828 mg. of N-carbobenzyloxy - glycyl - nitro - L - arginyl - L - valyl - L - tyrosyl - L - valyl - L - histidyl - L - prolyl - L - phenylalinine methyl ester melting at about 160° C. with decomposition. It is sufficiently pure for further processing. The butanolic filtrate yields on further concentration only little, impure material.

EXAMPLE 3

*Glycyl-L-Arginyl-L-Valyl-L-Tyrosyl-L-Valyl-L-Histidyl-L-Prolyl-L-Phenylalanine Methyl Ester*

828 mg. of N-carbobenzyloxy-glycyl-nitro-L-arginyl-L-valyl-L-tyrosyl-L-valyl-L-histidyl-L-prolyl-L-phenylalanine methyl ester are dissolved in 10 cc. of methanol and 4.2 cc. of methanolic N-hydrochloric acid; 300 mg. of a palladium carbon catalyst of 10% strength are added, and the mixture is hydrogenated with absorption of carbon dioxide. When 5.1 mols of hydrogen have been absorbed, the hydrogenation comes to a standstill (after 12 hours). The catalyst is filtered off and the filtrate evaporated in vacuo and dried at 40° C. in a high vacuum, to yield 763 mg. of an amorphous powder (mixture of octapeptide methyl ester trihydrochloride and ammonium chloride) which is used for the hydrolysis as it is.

EXAMPLE 4

*Glycyl-L-Arginyl-L-Valyl-L-Tyrosyl-L-Valyl-L-Histidyl-L-Prolyl-L-Phenylalanine*

760 mg. of the crude methyl ester are dissolved in 5 cc. of concentrated aqueous hydrochloric acid and heated for 1 hour at 40° C. Evaporation to dryness in a high vacuum yields 750 mg. of a pulverulent hydrochloride which is dissolved in a small amount of water and filtered through a weakly basic ion exchanger (Merck II as the acetate; column: diameter 12.5 mm., 12 cm. long). On being lyophilized, filtrate yields 675 mg. of a crude product which is purified by being distributed according to Craig over 60 stages (system: n-butanol/water/methanol 5:5:1; phase volume 10 cc. each). The tubes 6–19 (maximum in No. 12; G=0.26) yield 562 mg. of pure glycyl-L-arginyl-L-valyl-L-tyrosyl-L-valyl-L-histidyl-L - prolyl-L-phenylalanine monoacetate. The product is readily soluble in water, soluble in methanol and sparingly soluble in ethanol. Addition of saturated sodium chloride solution to its aqueous solution causes it to precipitate therefrom. Melting point about 220° C. with decomposition. In the paper chromatogram (descending, on Whatman paper No. 3) uniform spots are obtained which display a positive reaction to Pauly reagents and ninhydrin. In the system tertiary amyl alcohol/triethylamine/veronal/water/isopropanol (100:0.8:1.8:50:40) $R_f$=0.48 is obtained, in the system secondary butanol/monochloracetic acid/water/isopropanol (70:3:40:10) $R_f$=0.44.

What is claimed is:

1. Glycyl-L-α-(amino-lower alkyl)-α-amino-acetyl-L-α-lower alkyl-α-amino-acetyl-L-tyrosyl-L-α-lower alkyl-α-amino-acetyl-L-histidyl-L-prolyl-L-phenylalanine.

2. Glycyl-L-arginyl-L-valyl-L-tyrosyl-L-valyl-L-histidyl-prolyl-L-phenylalanine.

3. Acid addition salts of the compound claimed in claim 1 with therapeutically acceptable acids.

4. Acid addition salts of the compound claimed in claim 2 with therapeutically acceptable acids.

References Cited in the file of this patent

Lentz et al.: Jour. of Experimental Medicine 104, pp. 183–91 (1956).

Skeggs et al.: Ibid, pp. 193–197 (1956).

Elliott et al.: Nature, 177, pp. 527–8 (1956).

Anson: Advances in Protein Chemistry, vol. V, pp. 35 and 38 (1949), Academic Press Inc., Publishers. (Copies in Library.)